United States Patent
Sakamoto

(10) Patent No.: US 12,083,828 B2
(45) Date of Patent: Sep. 10, 2024

(54) PNEUMATIC TIRE

(71) Applicant: The Yokohama Rubber Co., LTD., Tokyo (JP)

(72) Inventor: Yousuke Sakamoto, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 652 days.

(21) Appl. No.: 17/256,883

(22) PCT Filed: Jul. 1, 2019

(86) PCT No.: PCT/JP2019/026051
§ 371 (c)(1),
(2) Date: Dec. 29, 2020

(87) PCT Pub. No.: WO2020/009056
PCT Pub. Date: Jan. 9, 2020

(65) Prior Publication Data
US 2021/0331527 A1    Oct. 28, 2021

(30) Foreign Application Priority Data

Jul. 2, 2018  (JP) .................................. 2018-126072

(51) Int. Cl.
*B60C 11/13*      (2006.01)
*B60C 11/12*      (2006.01)
*B60C 11/03*      (2006.01)

(52) U.S. Cl.
CPC .............. *B60C 11/12* (2013.01); *B60C 11/13* (2013.01); *B60C 2011/0353* (2013.01); *B60C 2011/0355* (2013.01); *B60C 2011/036* (2013.01); *B60C 2011/1361* (2013.01)

(58) Field of Classification Search
CPC ..... B60C 11/0306; B60C 11/11; B60C 11/12; B60C 11/13; B60C 2011/0346;
(Continued)

(56) References Cited

U.S. PATENT DOCUMENTS 5,109,904 A    5/1992  Numata et al.
2013/0068359 A1  3/2013  Suita
(Continued)

FOREIGN PATENT DOCUMENTS

CA    2009821 A1    8/1990
CN    101314317 A   12/2008
(Continued)

OTHER PUBLICATIONS

Machine translation of RU-2032549-C1 (no date).*

*Primary Examiner* — Justin R Fischer
*Assistant Examiner* — Philip N Schwartz
(74) *Attorney, Agent, or Firm* — Thorpe North & Western

(57) ABSTRACT

A pair of main grooves disposed on both sides of a tire equator of a pneumatic tire and extending along a tire circumferential direction is configured so that a series of bent elements formed by connecting at least five linear groove portions via bend points are continuously and repeatedly arranged in the tire circumferential direction, and the at least five linear groove portions included in each of the bent elements have three or more types of inclination angles with respect to the tire circumferential direction and have five or more types of lengths.

19 Claims, 4 Drawing Sheets

(58) Field of Classification Search
CPC ..... B60C 2011/0348; B60C 2011/0353; B60C 2011/0355; B60C 2011/036; B60C 2011/1361
See application file for complete search history.

(56) References Cited

U.S. PATENT DOCUMENTS

| | | | |
|---|---|---|---|
| 2015/0352906 A1 | 12/2015 | Nomura | |
| 2017/0136830 A1* | 5/2017 | Kuwano | B60C 11/11 |
| 2018/0001710 A1* | 1/2018 | Fujioka | B60C 11/1369 |
| 2020/0001657 A1* | 1/2020 | Matsubara | B60C 11/1204 |
| 2022/0118796 A1* | 4/2022 | Sakamoto | B60C 11/11 |

FOREIGN PATENT DOCUMENTS

| | | | | |
|---|---|---|---|---|
| CN | 103009934 A | 3/2013 | | |
| CN | 103101404 A | 5/2013 | | |
| CN | 103568734 A | 2/2014 | | |
| CN | 104139672 A | 11/2014 | | |
| CN | 104981363 A | 10/2015 | | |
| CN | 107199833 A | 9/2017 | | |
| EP | 2689940 A1 * | 1/2014 | ......... | B60C 11/0306 |
| JP | 2-57408 A | 2/1990 | | |
| JP | 2-216304 A | 8/1990 | | |
| JP | 4-197807 A | 7/1992 | | |
| JP | 2000-94909 A | 4/2000 | | |
| JP | 2008-296795 A | 12/2008 | | |
| JP | 2009-61886 A | 3/2009 | | |
| JP | 2013-119277 A | 6/2013 | | |
| JP | 2014-37157 A | 2/2014 | | |
| JP | 2014-218159 A | 11/2014 | | |
| JP | 2016-007861 A | 1/2016 | | |
| JP | 2017-88098 A | 5/2017 | | |
| KR | 10-2014-0020771 A | 2/2014 | | |
| RU | 2032549 C1 * | 4/1995 | ............. | B60C 11/04 |

* cited by examiner

PNEUMATIC TIRE

TECHNICAL FIELD

The present technology relates to a pneumatic tire suitable as a tire for driving on unpaved roads and, more particularly, to a pneumatic tire that provides improved noise performance and driving performance on unpaved roads.

BACKGROUND ART

As a pneumatic tire used for driving on unpaved roads such as an uneven ground surface, a muddy ground surface, a snowy road, a sandy ground surface, and a rocky ground surface, a tire including a tread pattern, which mainly includes lug grooves or blocks having a large number of edge components and has a large groove area, is generally adopted. Such a tire achieves traction performance by biting mud, snow, sand, stones, rocks, or the like on a road surface (hereinafter, referred to collectively as "mud or the like") and prevents grooves from being clogged with mud or the like, and thus provides improved driving performance on unpaved roads (for example, see Japan Unexamined Patent Publication Nos. 2016-007861 and 2013-119277).

When comparing the tires of Japan Unexamined Patent Publication Nos. 2016-007861 and 2013-119277, the tire of Japan Unexamined Patent Publication No. 2016-007861 is a type of tire that has a relatively small groove area and is designed in consideration of driving performance on paved roads as well. On the other hand, the tire of Japan Unexamined Patent Publication No. 2013-119277 is a type of tire that has a large groove area and large blocks, and is designed particularly in consideration of driving performance on unpaved roads. As a result, the former has inferior driving performance on unpaved roads to that of the latter, and the latter tends to have inferior performance at the time of normal driving to that of the former. In recent years, performance requirements for tires have become diverse, and tires for driving on unpaved roads, which have the intermediate level of performance between such two types of tires, have been demanded. In addition, solutions have been demanded to efficiently enhance driving performance on unpaved roads with a suitable groove shape. Moreover, as described above, basically, the tires for driving on unpaved roads mainly include blocks and has a large groove area, and thus noise performance (for example, pattern noise) tends to easily decrease. As a result, the noise performance is also required to be maintained stably or improved.

SUMMARY

The present technology provides a pneumatic tire that provides improved noise performance and driving performance on unpaved roads.

A pneumatic tire according to an embodiment of the present technology includes: a tread portion that extends in a tire circumferential direction and forms an annular shape; a pair of sidewall portions disposed on both sides of the tread portion; a pair of bead portions disposed on an inner side of the pair of sidewall portions in a tire radial direction; and a pair of main grooves extending along the tire circumferential direction on both sides of a tire equator of the tread portion, each of three rows of land portions defined by the pair of main grooves being further defined into a plurality of blocks, the pair of main grooves being configured so that a series of bent elements formed by connecting at least five linear groove portions via bend points are continuously and repeatedly arranged in the tire circumferential direction, and the at least five linear groove portions included in each of the series of bent elements having three or more types of inclination angles with respect to the tire circumferential direction and having five or more types of lengths.

In the present technology, as described above, since the main groove is formed by repeatedly arranging the bent elements that are bent in a complex manner by connecting the linear groove portions having different lengths and inclination angles, the edge effect can be efficiently exhibited and the driving performance on unpaved roads can be effectively enhanced as compared to conventional simple zigzag-shaped main grooves. In addition, since the block adjacent to the main groove that is bent in such a complex manner is not constant in shape, the generation of pattern noise can be suppressed. Additionally, since the main groove is bent in a complex manner, air column resonance can be suppressed, noise transmission can be suppressed, and noise performance can be enhanced.

In an embodiment of the present technology, it is preferable that three linear groove portions adjacent to each other in the tire circumferential direction in each of the series of bent elements are a displacement groove portion having a length shorter than a groove width of the pair of main grooves, and a pair of parallel groove portions arranged on both sides in the tire circumferential direction and having a same inclination angle. With such a structure, since each bent element has a shape in which grooves extending in the same direction are slightly displaced (offset) midway in the groove width direction, and the groove shape is satisfactory, it is advantageous in improving the edge effect and improving the driving performance on unpaved roads.

In an embodiment of the present technology, it is preferable that a shoulder block defined on an outer side in the tire width direction of the pair of main grooves among the plurality of blocks is defined by a shoulder lug groove extending from the pair of main grooves beyond a ground contact edge, and two of the shoulder blocks are disposed on the outer side in the tire width direction of one of the series of bent elements. By providing two blocks with respect to one repeating unit (bent element) in this manner, the balance between the groove shape and the block arrangement is improved, which is advantageous in improving the edge effect and improving the driving performance on unpaved roads.

In this case, preferably, the pair of main grooves and the shoulder lug groove have a same groove depth. Due to this, the balance between the groove volume and the rigidity of the shoulder block is improved, and the edge effect is improved, which is advantageous in improving the driving performance on unpaved roads.

In an embodiment of the present technology, preferably, the pneumatic tire includes projections on a groove bottom of the pair of main grooves, the projections rising from the groove bottom of the pair of main grooves and extending along the pair of main grooves. Due to this, the edge effect of the projection can be obtained, and the effect of preventing stone biting of the main groove can be expected, which is advantageous in enhancing the driving performance on unpaved roads.

In the present technology, it is preferable that, when a length in the tire width direction from the tire equator to the ground contact edge is defined as a distance W, the pair of main grooves is disposed on the outer side in the tire width direction at a position separated from the tire equator by 30% or more of the distance W. Additionally, it is preferable that the pair of main grooves is disposed on an inner side in the tire width direction at a position separated from the ground contact edge by 20% or more of the distance W. By disposing the main groove having the above-described specific bent shape in the appropriate region in this way, the edge effect caused by the main groove can be effectively exhibited, which is advantageous in improving the driving performance on unpaved roads.

In an embodiment of the present technology, preferably a maximum width of the pair of main grooves is from 9 mm to 20 mm. In the embodiment of the present technology, preferably, a groove depth of the pair of main grooves is from 10 mm to 18 mm. By defining the dimensions of the main grooves in this way, the balance between the groove volume and the rigidity of the blocks defined by the main grooves is improved, and the edge effect is improved, which is advantageous in improving the driving performance on unpaved roads.

In an embodiment of the present technology, it is preferable that, when a block defined on the outer side in the tire width direction of the pair of main grooves among the plurality of blocks is defined as a shoulder block, and a block defined between the pair of main grooves is defined as a center block, a sipe that is open to the pair of main grooves is formed in a road contact surface of the shoulder block, and a narrow groove that is open to the pair of main grooves is formed in a road contact surface of the center block. By providing optimal additional elements (the sipes or the narrow grooves) in each block, the groove area can be increased while maintaining the rigidity of each block satisfactorily, which is advantageous in improving the driving performance on unpaved roads.

In an embodiment of the present technology, it is preferable that the shoulder block defined on the outer side in the tire width direction of the pair of main grooves among the plurality of blocks is defined by the shoulder lug groove extending from the pair of main grooves beyond the ground contact edge, the center block defined between the pair of main grooves among the plurality of blocks is defined by center lug grooves that connect the pair of main grooves and extend in the tire width direction and auxiliary grooves that connect the center lug grooves adjacent to each other in the tire circumferential direction, a first groove element formed from narrow grooves and/or sipes is provided on a surface of the shoulder block and a second groove element formed from narrow grooves and/or sipes is provided on a surface of the center block, the first groove element extending from a side surface on a ground contact edge side of the shoulder block to the road contact surface and communicating with the pair of main grooves, and the second groove element extending across the center block and communicating with the pair of main grooves or the auxiliary grooves, and the first groove element and the second groove element form a series of crossing groove groups extending continuously along blocks from the shoulder block on one side in the tire width direction to the shoulder block on an other side in the tire width direction across the pair of main grooves or the auxiliary grooves. Since a series of crossing groove groups extending continuously along the blocks from the shoulder block on one side in the tire width direction to the shoulder block on the other side in the tire width direction are provided in this manner, it is possible to ensure the edge effect resulting from the series of crossing groove groups as a set of the first and second groove elements and improve the driving performance on unpaved roads. In this case, since an individual groove element (each of the first and second groove elements) includes the sipe or the narrow groove which has a sufficiently smaller groove area than the main groove, the lug grooves, and the like, the individual groove element does not become a factor that significantly increases the groove area of the entire tread pattern or affect the tire performance under normal travel conditions. Thus, the driving performance on unpaved roads can be efficiently enhanced.

In an embodiment of the present technology, it is preferable that, when the bent element includes five linear groove portions, and the five linear groove portions are first to fifth linear groove portions in that order from one side in the tire circumferential direction toward an other side in the tire circumferential direction, an inclination angle of the first linear groove portion with respect to the tire circumferential direction is from 5° to 20°, and a percentage of a length of the first linear groove portion with respect to a total length of the five linear groove portions constituting the bent element is from 15% to 35%, an inclination angle of the second linear groove portion with respect to the tire circumferential direction is from 150° to 170°, and a percentage of a length of the second linear groove portion with respect to the total length of the five linear groove portions constituting the bent element is from 5% to 25%, an inclination angle of the third linear groove portion with respect to the tire circumferential direction is from 50° to 70°, and a percentage of a length of a third linear groove portion with respect to the total length of the five linear groove portions constituting the bent element is from 3% to 15%, an inclination angle of the fourth linear groove portion with respect to the tire circumferential direction is from 150° to 170°, and a percentage of a length of the fourth linear groove portion with respect to the total length of the five linear groove portions constituting the bent element is from 30% to 45%, and an inclination angle of the fifth linear groove portion with respect to the tire circumferential direction is from 50° to 70°, and a percentage of a length of the fifth linear groove portion with respect to the total length of the five linear groove portions constituting the bent element is from 15% to 35%. By setting the inclination angles and the lengths of the linear groove portions in this manner, when the bent elements are composed of five linear groove portions, it is possible to optimize the groove shape, which is advantageous in improving the edge effect and improving the driving performance on unpaved roads.

In an embodiment of the present technology, "tire ground contact edge" is either end portion in a ground contact region in the tire axial direction, which is formed when a regular load is applied to the tire in a state where the tire mounted on a regular rim and inflated to a regular internal pressure is placed vertically on a flat surface. "Regular rim" refers to a rim defined by a standard for each tire according to a system of standards that includes standards with which tires comply, and is a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). In the system of standards, including standards with which tires comply, "regular internal pressure" is air pressure defined by each of the standards for each tire and is referred to as "maximum air pressure" in the case of JATMA, the maximum value being listed in the table "TIRE ROAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
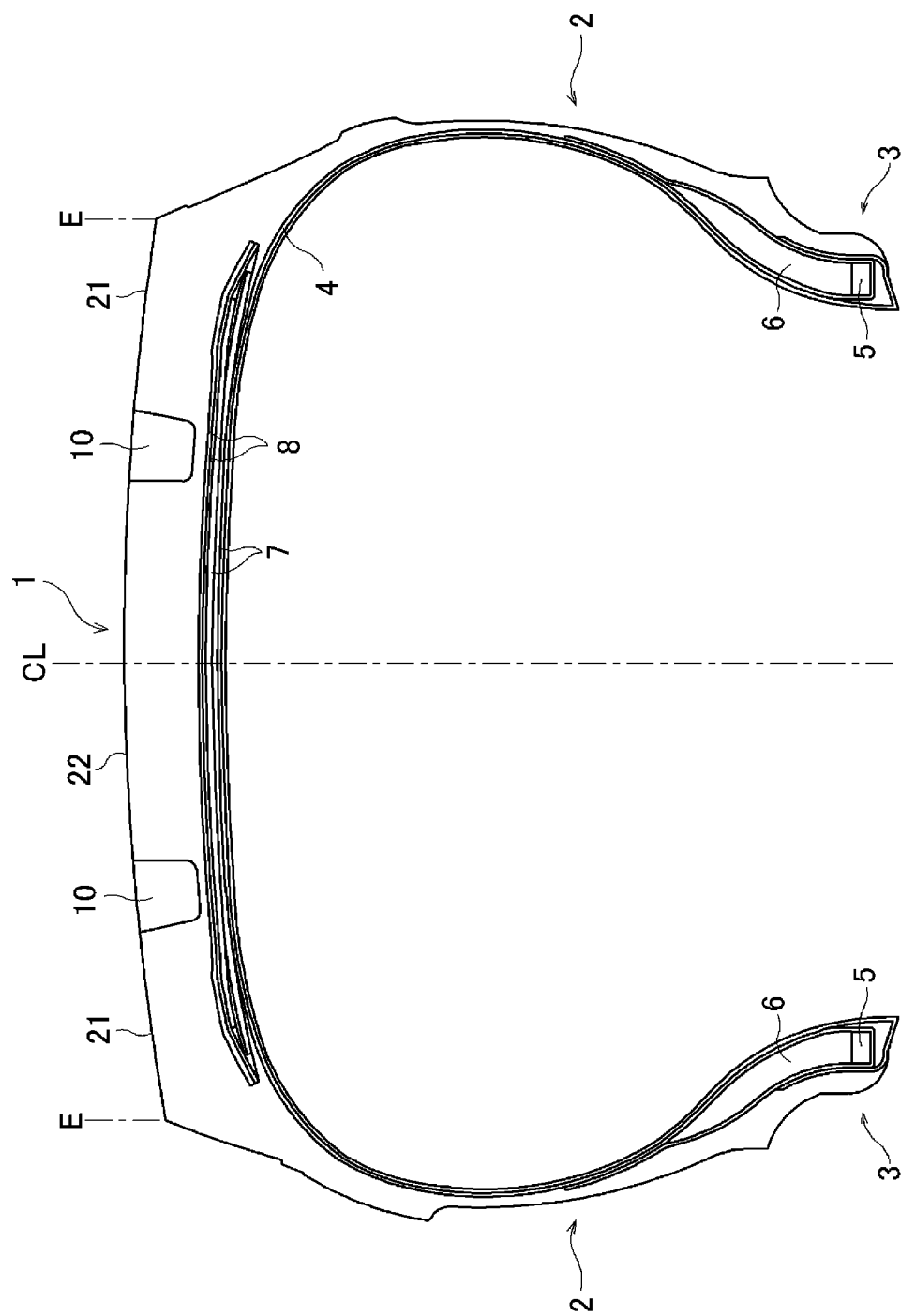
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 in an inner side in a tire radial direction. In FIG. 1, reference sign CL denotes a tire equator, and reference sign E denotes a ground contact edge. Additionally, FIG. 1 is a meridian cross-sectional view, and accordingly, although not illustrated, each of the tread portion 1, the sidewall portion 2, and the bead portions 3 extends in the tire circumferential direction to form an annular shape. Thus, the basic structure of the toroidal shape of the pneumatic tire is configured. Although the description using FIG. 1 is basically based on the illustrated meridian cross-sectional shape, all of the tire components each extend in the tire circumferential direction and form the annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a pneumatic tire having a general cross-sectional structure; however, the basic structure is not limited to the aforementioned structure.

Figure 2:
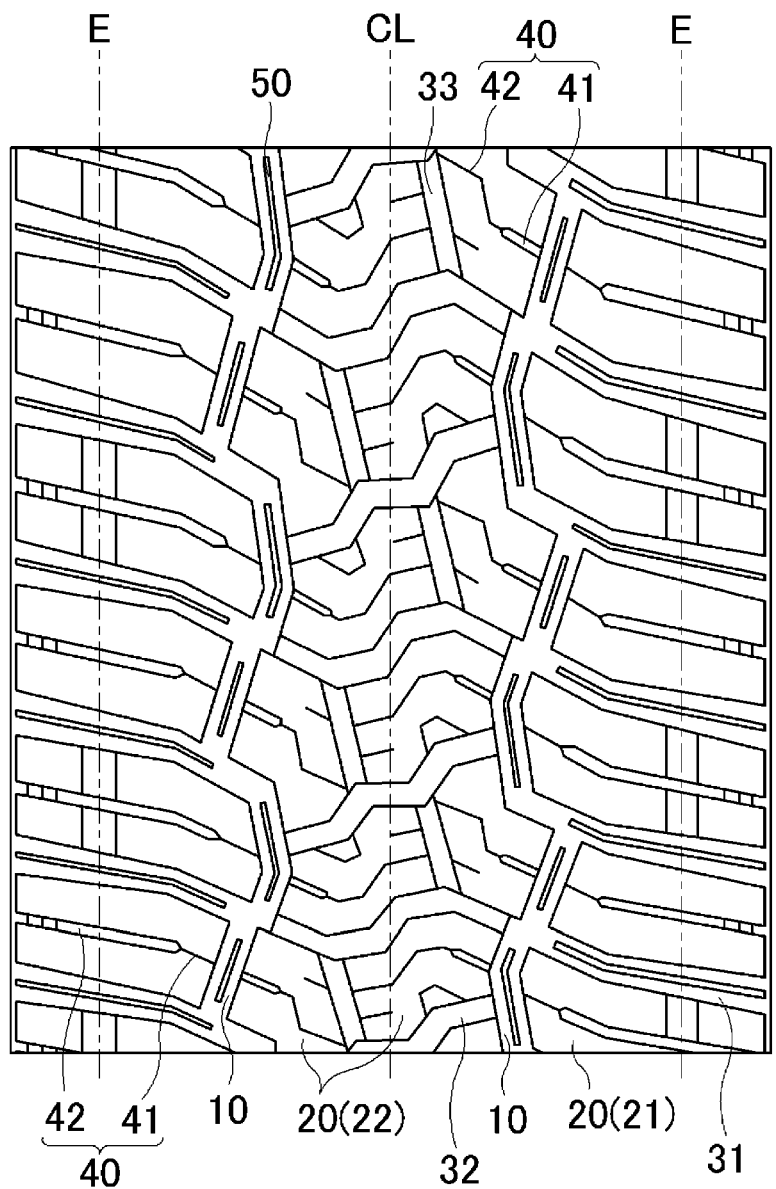
FIG. 2 is a front view illustrating a tread surface of the pneumatic tire according to the embodiment of the present technology.

As illustrated in FIG. 2, a surface of the tread portion 1 of the pneumatic tire according to an embodiment of the present technology is provided with a pair of main grooves 10 extending in the tire circumferential direction on both sides of the tire equator CL. These main grooves 10 have a maximum width of, for example, from 9 mm to 20 mm and a groove depth of, for example, from 10 mm to 18 mm. As described below, these main grooves 10 have a zigzag shape in which portions (linear groove portions 11) that extend linearly in a predetermined direction are connected via bend points.

The three rows of land portions defined by these main grooves 10 are further defined into blocks 20 by various grooves. In the present technology, if the entire tread pattern is a block pattern based on the blocks 20, the shape of the individual blocks 20 is not particularly limited. For example, in the illustrated example, shoulder blocks 21 are defined on the outer side in the tire width direction of a pair of main grooves of the plurality of blocks 20, and center blocks 22 are defined between the pair of main grooves. The shoulder blocks 21 are defined by shoulder lug grooves 31 extending from the main grooves 10 beyond the ground contact edge E, and a plurality of shoulder blocks 21 are arranged in the tire circumferential direction. The center blocks 22 are defined by center lug grooves 32 that connect the pair of main grooves 10 and extend in the tire width direction and auxiliary grooves 33 that connect the center lug grooves 32 adjacent to each other in the tire circumferential direction, and two rows of center blocks 22 disposed on both sides of the auxiliary grooves 33 are repeatedly arranged in the tire circumferential direction. Sipes 41 and narrow grooves 42 may be optionally provided on the road contact surface of these blocks 20.

Note that, among the lug grooves that further divide the land portions defined by the main grooves 10 into blocks 20, the groove width of the shoulder lug grooves 31 may be, for example, from 9 mm to 20 mm, and the groove depth may be, for example, from 12 mm to 17 mm, and the groove width of the center lug grooves 32 may be, for example, 7 mm to 13 mm, and the groove depth may be, for example, 11 mm to 14 mm. In particular, the shoulder lug grooves 31 may have the same groove depth as the main grooves 10. Moreover, the groove width of the main grooves 11 may be, for example, from 7 mm to 10 mm, and the groove depth may be, for example, from 9 mm to 12 mm. Additionally, the optional sipe 41 is a fine groove having a groove width of from 0.5 mm to 2.0 mm, for example, and a groove depth of from 2 mm to 15 mm, for example, and the optional narrow groove 42 is a groove having a groove width and a groove depth that are sufficiently smaller than those of the main grooves 10 and the lug grooves, and the groove width is from 0.5 mm to 4.0 mm, for example, and the groove depth is from 2 mm to 15 mm, for example.

Figure 3:
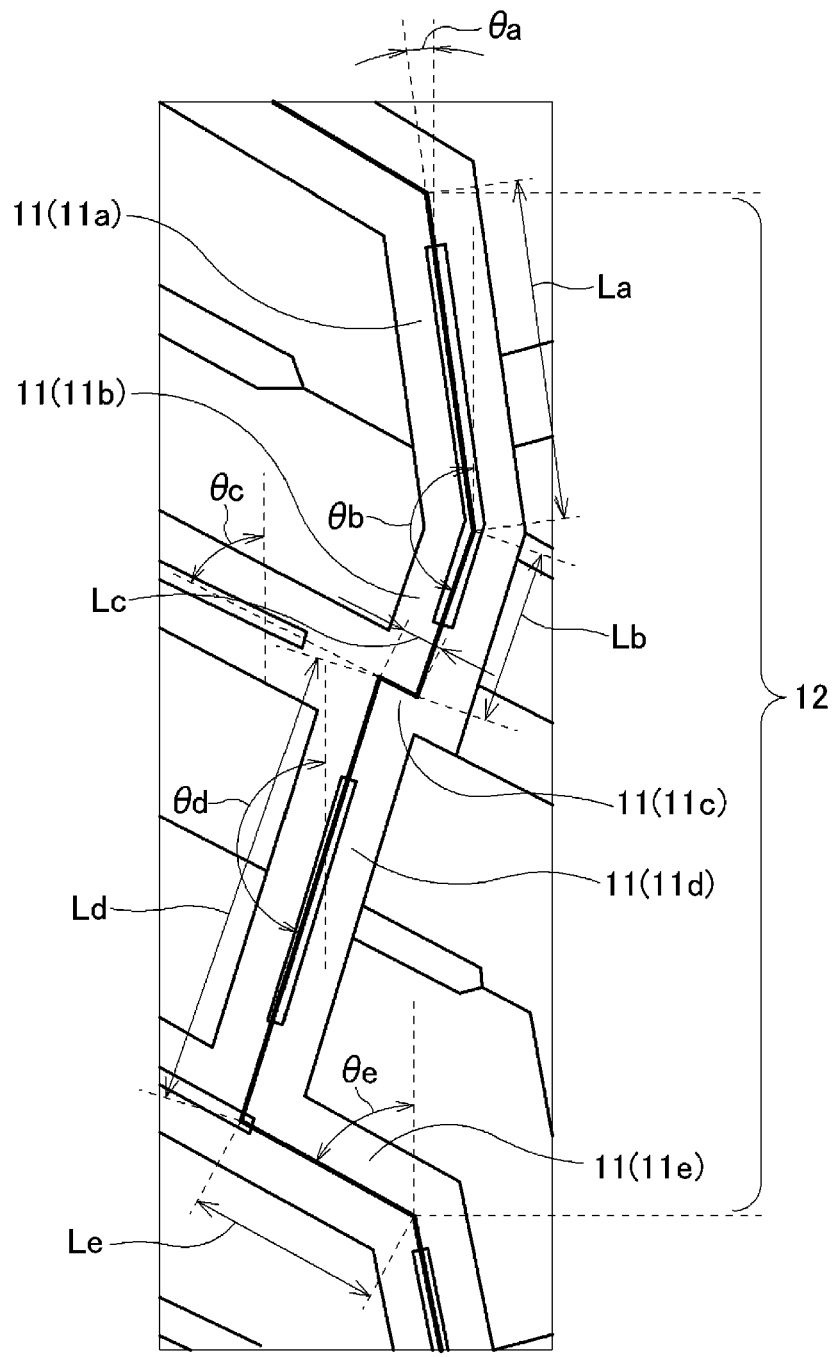
FIG. 3 is an explanatory diagram schematically illustrating an example of a bent element of the present technology.

The main groove 10 is formed in such a way that a series of bent elements 12 formed by connecting at least five linear groove portions 11 via bend points are repeatedly arranged in the tire circumferential direction. The at least five linear groove portions 11 included in each of the bent elements 12 have three or more types of inclination angles with respect to the tire circumferential direction and have five or more types of lengths. Taking the illustrated main groove 10 as an example, the bent element 12 of the main groove 10 is composed of five linear groove portions 11. In this case, as illustrated in enlarged detail in FIG. 3, when the five linear groove portions 11 are first to fifth linear groove portions 11a to 11e in order from one side in the tire circumferential direction toward the other side in the tire circumferential direction, the first through fifth linear groove portions 11a to 11e have different lengths La to Le (that is, five linear groove portions have five types of lengths). Additionally, when the inclination angles of the first to fifth linear groove portions 11a to 11e with respect to the tire circumferential direction are θa to θe, respectively, in the illustrated example, the inclination angle θb of the second linear portion 11b and the inclination angle θd of the fourth linear portion 11d are the same, and the inclination angle θc of the third linear portion 11c and the inclination angle θe of the fifth linear portion 11e are the same. Therefore, the five linear groove portions 11a to 11e have three types of inclination angles (that is, the inclination angle θa of the first linear groove portion 11a, the inclination angle (θb=θd) of the second linear groove portion 11b and the fourth linear groove portion 11d, and the inclination angle (θc=θe) of the third linear groove portion 11c and the fifth linear groove portion 11e). Note that the lengths (La to Le) and the inclination angles (θa to θe) of the linear groove portions are measured on the basis of the groove center line (thick line in the drawing) as illustrated in the drawing.

In this manner, since the main groove 10 is formed by repeatedly arranging the bent elements 12 that are bent in a complex manner by connecting the linear groove portions 11 having different lengths and inclination angles, the edge effect can be efficiently exhibited and the driving performance on unpaved roads can be effectively enhanced as compared to conventional simple zigzag-shaped main grooves. In addition, since the block 20 adjacent to the main groove 10 that is bent in such a complex manner is not constant in shape, the generation of pattern noise can be suppressed. Additionally, since the main groove 10 is bent in a complex manner, air column resonance can be suppressed, noise transmission can be suppressed, and noise performance can be enhanced.

If the number of linear groove portions 11 included in the bent element 12 is less than 5, since the main groove 10 is not sufficiently bent, it is difficult to obtain a sufficient edge effect. If the number of types of inclination angles is less than three types, or the number of types of lengths is less than five types, since the bent shape of the bent element 12 becomes monotonic, it is difficult to increase the edge effect sufficiently. Note that in a tire having a pitch variation, it is not necessary for the completely identical bent elements 12 to be repeatedly arranged, and a plurality of types of similarly shaped bent elements 12 in which the ratio in the tire circumferential direction varies (stretches) in accordance with the pitch variation is repeated. In this case, the individual bent elements 12 are formed by connecting at least five linear groove portions 11 via the bend points, have three or more types of inclination angles with respect to the tire circumferential direction, and have five or more types of lengths, and thus the effect of the present technology can be exhibited.

When the bent elements 12 are repeatedly arranged in the tire circumferential direction, since it is required that the positions in the tire width direction of the end portion on one side in the tire circumferential direction of the bent element 12 and the end portion on the other side overlap each other, it is preferable that, when the bent element 12 is composed of five linear groove portions 11 as illustrated in the drawing, two sets of linear groove portions 11 having the same inclination angle are included. In the illustrated example, as described above, since the second linear portion 11b and the fourth linear portion 11d have the same inclination angle (θb=θd), the third linear portion 11c and the fifth linear portion 11e have the same inclination angle (θc=θe), and this condition is satisfied, a satisfactory edge effect can be exhibited.

The pair of main grooves 10 both have a structure including the above-described bent element 12. However, it is preferable that the bent element 12 that constitutes the main groove 10 on one side in the tire width direction of the tire equator and the bent element 12 that constitutes the main groove 10 on the other side are in a point-symmetric relationship with respect to the points on the tire equator CL as in the illustrated example.

As illustrated in the drawing, when the bent elements 12 are composed of five linear groove portions 11, and the five linear groove portions 11 are the first to fifth linear groove portions 11a to 11e in that order from one side in the tire circumferential direction toward the other side in the tire circumferential direction, the inclination angle θa of the first linear groove portion 11a with respect to the tire circumferential direction can be set to from 5° to 20°, for example, the percentage of the length La of the first linear groove portion 11a with respect to the total length Lt of the five linear groove portions 11 constituting the bent element 12 can be set to from 15% to 35%, for example, the inclination angle θb of the second linear groove portion 11b with respect to the tire circumferential direction can be set to from 150° to 170°, for example, the percentage of the length Lb of the second linear groove portion 11b with respect to the total length Lt of the five linear groove portions 11 constituting the bent element 12 can be set to from 5% to 25%, for example, the inclination angle θc of the third linear groove portion 11c with respect to the tire circumferential direction can be set to from 50° to 70°, for example, the percentage of the length Lc of the third linear groove portion 11c with respect to the total length Lt of the five linear groove portions 11 constituting the bent element 12 can be set to from 3% to 15%, for example, the inclination angle θd of the fourth linear groove portion 11d with respect to the tire circumferential direction can be set to from 150° to 170%, for example, the percentage of the length Ld of the fourth linear groove portion 11d with respect to the total length Lt of the five linear groove portions 11 constituting the bent element 12 can be set to from 30% to 70%, for example, the inclination angle θe of the fifth linear groove portion 11e with respect to the tire circumferential direction can be set to from 50° to 70°, for example, and the percentage of the length Le of the fifth linear groove portion 11e with respect to the total length Lt of the five linear groove portions 11 constituting the bent element 12 can be set to from 15% to 35%, for example. By setting the inclination angles and the lengths of the linear groove portions 11 in this manner, when the bent elements 12 are composed of five linear groove portions 11, it is possible to optimize the groove shape, which is advantageous in improving the edge effect and improving the driving performance on unpaved roads.

In the present technology, the individual bent elements 12 may have various shapes as long as the aforementioned conditions are satisfied, but in order to obtain a superior edge effect, three linear groove portions 11 adjacent to each other in the tire circumferential direction of each of the bent elements 12 may form the offset connection described below. That is, the three linear groove portions adjacent to each other in the tire circumferential direction in each of the bent elements are preferably displacement groove portions having a length shorter than the groove width of the main groove 10 and a pair of parallel groove portions arranged on both sides in the tire circumferential direction and having the same inclination angle. In the illustrated example, the third linear groove portion 11c corresponds to the displacement groove portion, and the second linear groove portion 11b and the fourth linear groove portion 11d correspond to a pair of parallel groove portions. When such a portion is included, since each bent element 12 has a shape in which grooves extending in the same direction are slightly displaced (offset) midway in the groove width direction, and the groove shape is satisfactory, it is advantageous in improving the edge effect and improving the driving performance on unpaved roads. Note that the length of the displacement groove portion is preferably from 40% to 80% of the groove width of the main groove 10. If the length of the displacement groove portion is less than 40% of the groove width of the main groove 10, the displacement (offset) of the pair of parallel groove portions will be substantially eliminated, and further improvement in the edge effect cannot be expected. If the length of the displacement groove portion exceeds 80% of the groove width of the main groove 10, a large bend that does not correspond to the offset connection described above is formed, and a desired effect cannot be obtained.

As described above, the shape of the individual blocks 20 is not particularly limited, but good arrangement of the bent elements 12 and the blocks 20 is effective in improving the driving performance on unpaved roads. For example, as in the illustrated example, it is preferable that two shoulder blocks 21 are arranged on the outer side in the tire width direction of one bent element 12. By providing two blocks 20 with respect to one repeating unit (bent element 12) in this manner, the balance between the groove shape and the block arrangement is improved, which is advantageous in improving the edge effect and improving the driving performance on unpaved roads. Particularly, as described above, when the pair of parallel groove portions (the second linear groove portion 11b and the fourth linear groove portion 11d) are connected by the displacement groove portion (the third linear groove portion 11c), it is preferable that the displacement groove portion (the third linear groove portion 11c) and the shoulder lug groove 31 are connected and one shoulder block 21 is disposed on each of the outer sides in the tire width direction of each of the parallel groove portions (the second linear groove portion 11b and the fourth linear groove portion 11d).

One main groove 10 is disposed on each side of the tire equator CL, but the main grooves 10 are preferably disposed at positions that are appropriately separated from the tire equator CL or the ground contact edge E. Specifically, when the length in the tire width direction from the tire equator CL to the ground contact edge E is defined as the distance W, each of the main grooves 10 is preferably disposed on the outer side in the tire width direction at a position separated from the tire equator CL by preferably 30% or more of the distance W. Additionally, each of the main grooves 10 is preferably disposed on the inner side in the tire width direction at a position separated from the ground contact edge E by preferably 20% or more of the distance W. By disposing the main groove 10 having the above-described specific bent shape in the appropriate region in this way, the edge effect caused by the main groove 10 can be effectively exhibited, which is advantageous in improving the driving performance on unpaved roads.

The groove bottom of the main groove 10 is preferably provided with a projection 50 that rises from the groove bottom of the main groove 10 and extends along the main groove 10. The projection 50 does not occupy the entire width of the main groove 10 at the portion when rising from the groove bottom, but the projection 50 is provided at the center portion of the main groove 10 so as to be separated from the groove walls of the main groove 10. By providing the projection 50 in this manner, the edge effect of the projection 50 can be obtained, and the effect of preventing stone biting of the main groove 10 can be expected, which is advantageous in enhancing the driving performance on unpaved roads. The rising height of the projection 50 from the groove bottom is preferably from 1.5 mm to 2 mm.

When the projection 50 is provided in the groove bottom in this manner, it is preferable that the projection 50 is provided in only the linear groove portion having an inclination angle of from 8° to 45° with respect to the tire circumferential direction (in the illustrated example, the first linear groove portion 11a, the second linear groove portion 11b, and the fourth linear groove portion 11d). Additionally, rather than providing the projections individually in the individual linear groove portions, projections extending across the linear groove portions adjacent to each other in the tire circumferential direction may be provided (for example, in the illustrated example, the projection 50 extends across the first linear groove portion 11a and the second linear groove portion 11b). In any case, the percentage of the length of the projections 50 with respect to the total length of the linear groove portions 11 constituting the bent element 12 may be from 50% to 80%, for example. If the percentage of the length of the projections 50 with respect to the total length of the linear groove portions 11 is less than 50%, since the amount of the projections 50 is too small, the effect of providing the projections 50 is limited. If the percentage of the length of the projections 50 with respect to the total length of the linear groove portions 11 exceeds 80%, since the amount of the projections 50 increases and the groove volume decreases, there is a risk that the driving performance on unpaved roads may be affected.

As described above, the sipes 41 and the narrow grooves 42 may be optionally provided in each of the blocks 20. However, when the sipes 41 and the narrow grooves 42 are provided, sipes 41 that are open to the main grooves 10 are preferably formed in the road contact surface of the shoulder blocks 21, and narrow grooves 42 that are open to the main grooves 10 are preferably formed in the road contact surface of the center blocks 22. By providing optimal additional elements (the sipes 41 or the narrow grooves 42) in each block 20, the groove area can be increased while maintaining the rigidity of each block 20 satisfactorily, which is advantageous in improving the driving performance on unpaved roads.

Figure 4:
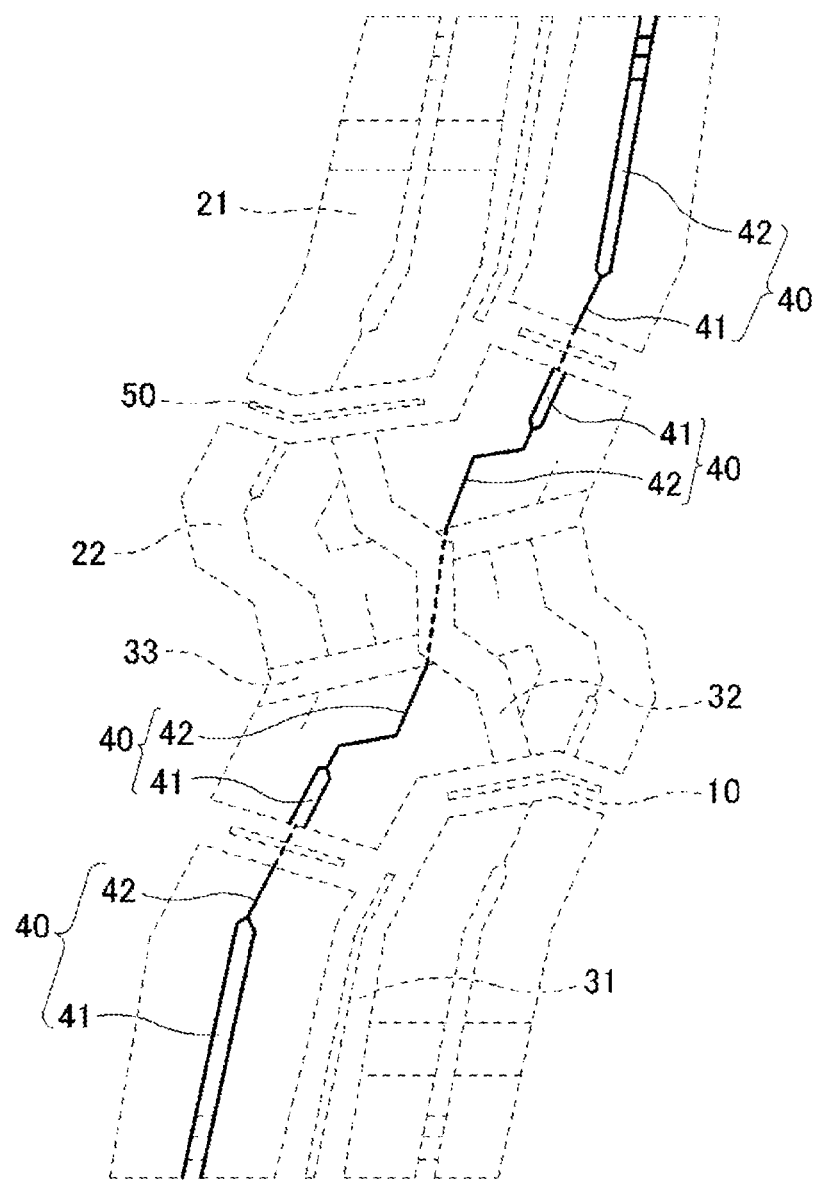
FIG. 4 is an explanatory diagram schematically illustrating an example of a crossing groove group of an embodiment of the present technology.

Additionally, the sipes 41 and the narrow grooves 42 may be disposed in combination in each block 20. In this case, when the sipes 41 and/or the narrow grooves 42 are collectively referred to as "groove elements 40", a groove element 40 provided in the surface of the shoulder block 21 is a first groove element 40a, and a groove element 40 provided in the surface of the center block 22 is a second groove element 40b, it is preferable that, as illustrated in FIG. 4, the first groove element 40a extends from the side surface on the ground contact edge E side of the shoulder block 21 to the road contact surface and communicates with the main groove 10, the second groove element 40b extends across the center block 22 and communicates with the main groove 10 or the auxiliary groove 33, and the first groove elements 40a and the second groove elements 40b form a series of crossing groove groups extending continuously along the blocks from the shoulder block 21 on one side in the tire width direction to the shoulder block 21 on the other side in the tire width direction across the main groove 10 or the auxiliary groove 33. In this case, as described above, it is preferable that the sipe 41 that is open to the main groove 10 side is disposed in the shoulder block 21, and the narrow groove 42 that is open to the main groove 10 side is disposed in the center block 22.

Since a series of crossing groove groups extending continuously along the blocks from the shoulder block 21 on one side in the tire width direction to the shoulder block 21 on the other side in the tire width direction are provided in this manner, it is possible to ensure the edge effect resulting from the series of crossing groove groups as a set of the first and second groove elements 40a and 40b and improve the driving performance on unpaved roads. In this case, since an individual groove element (each of the first and second groove elements 40a and 40b) includes the sipe 41 or the narrow groove 42 which has a sufficiently smaller groove area than the main groove 10, the lug grooves, and the like, the individual groove element does not become a factor that significantly increases the groove area of the entire tread pattern or affect the tire performance under normal travel conditions. Thus, the driving performance on unpaved roads can be efficiently enhanced.

EXAMPLES

Twenty-four pneumatic tires of Comparative Examples 1 to 4 and Examples 1 to 20 were manufactured. The pneumatic tires had a tire size of LT265/70R17 121Q and a basic structure as illustrated in FIG. 1. Based on the tread pattern of FIG. 2, the number of linear groove portions constituting the bent element, the types of inclination angles of the linear groove portions included in the bent element with respect to the tire circumferential direction, the inclination angle of each linear groove portion, the types of lengths of the linear groove portions included in the bent element, the length of each linear groove portion (the percentage against the total length of the linear groove portions included in the bent element), the groove width of the main grooves, the groove depth of the main grooves, the position of the main grooves, the groove depth of the shoulder lug grooves, the number of shoulder blocks disposed on the outer side in the tire width direction of one bent element, the presence of projections on the groove bottom, the type of groove elements formed on the road contact surface of the center block, the type of groove elements formed on the road contact surface of the shoulder blocks, and whether the crossing groove group is formed by the groove elements of each block were set as shown in Tables 1 to 3.

In accordance with the inclination angle and the length of each of the linear groove portions, the linear groove portions are referred to as a first linear groove portion, a second linear groove portion, . . . , and the like in order from one side in the tire circumferential direction to the other side in the tire circumferential direction in accordance with the number of linear groove portions constituting the bent elements, and the respective values are shown. The position of the main groove is expressed as the percentage of the distance from the tire equator to the main groove with respect to the distance W from the tire equator to the ground contact edge (the percentage of the distance from the ground contact edge to the main groove with respect to the distance W is also indicated in parentheses). The type of groove elements formed on the road contact surface of the center blocks indicates whether the narrow grooves and/or the sipes are provided, and when the narrow grooves and sipes are used in combination, "main groove-side groove element" and "tire equator-side groove element" are indicated in that order. For example, "narrow grooves/sipes" in Example 1 means that a compound groove in which narrow grooves and sipes are connected is formed in a center block, and as in the illustrated example, narrow grooves are disposed on the main groove side and sipes are disposed on the tire equator side. Similarly, the type of groove elements formed on the road contact surface of the shoulder blocks also indicates whether the narrow grooves and/or sipes are provided, and when the narrow grooves and sipes were used in combination, "main groove-side groove element" and "ground contact edge-side groove element" are indicated in that order. For example, "sipes/narrow grooves" in Example 1 means that a compound groove in which narrow grooves and sipes are connected is formed in a shoulder block, and as in the illustrated example, sipes are disposed on the main groove side and narrow grooves are disposed on ground contact edge side.

Note that in Comparative Example 1, since the main groove is not bent and extends linearly in the tire circumferential direction, the number of linear groove portions constituting the bent element, the types of inclination angles of the linear groove portion included in the bent element with respect to the tire circumferential direction, the inclination angle of each linear groove portion, the types of lengths of the linear groove portions included in the bent element, the length of each linear groove portion, and the like are left blank.

Noise performance and starting performance of these pneumatic tires were evaluated by the following evaluation methods, and the results are illustrated in Tables 1 to 3.

Noise Performance

The test tires were assembled on wheels having a rim size of 17×8 J, inflated to an air pressure of 350 kPa, and mounted on a test vehicle (four wheel drive SUV (Sport Utility Vehicle)), and sensory evaluations on pattern noise were performed by a test driver on a circuit of a paved road surface. Evaluation results are expressed as index values, with the value of Comparative Example 1 expressed as an index value of 100. Larger index values indicate a smaller pattern noise and superior noise performance. Note that when the index value is "106" or smaller, there is no substantial difference from Comparative Example 1 as the reference, which means that the effect of improving noise performance is not sufficiently obtained.

Startability

The test tires were assembled on wheels having a rim size of 17×8 J, inflated to an air pressure of 350 kPa, and mounted on a test vehicle (four wheel drive SUV), and sensory evaluations on startability were performed by a test driver on unpaved roads (gravel road surfaces). Evaluation results are expressed as index values, with the value of Comparative Example 1 expressed as an index value of 100. Larger index values indicate superior startability on unpaved roads. Note that when the index value is "106" or smaller, there is no substantial difference from the conventional label (Comparative Example 1 as the reference), which means that the effect of improving noise performance is not sufficiently obtained.

TABLE 1

|  |  |  | Comparative Example 1 | Comparative Example 2 | Example 1 | Comparative Example 3 |
|---|---|---|---|---|---|---|
| Number of linear groove portions |  |  | — | 2 | 5 | 5 |
| Types of inclination angles of linear groove portion |  |  | — | 2 | 3 | 2 |
| Inclination angle | First linear groove portion | ° | — | 10 | 9 | 10 |
|  | Second linear groove portion | ° | — | 20 | 163 | 20 |
|  | Third linear groove portion | ° | — | — | 62 | 10 |
|  | Fourth linear groove portion | ° | — | — | 163 | 20 |
|  | Fifth linear groove portion | ° | — | — | 62 | 10 |
|  | Sixth linear groove portion | ° | — | — | — | — |
| Types of lengths of linear groove portion |  |  | — | 2 | 5 | 5 |
| Length | First linear groove portion | % | — | 70 | 25 | 25 |
|  | Second linear groove portion | % | — | 28 | 15 | 15 |
|  | Third linear groove portion | % | — | — | 4 | 4 |
|  | Fourth linear groove portion | % | — | — | 37 | 37 |
|  | Fifth linear groove portion | % | — | — | 19 | 19 |
|  | Sixth linear groove portion | % | — | — | — | — |
| Groove width of main groove |  |  | 15 | 15 | 15 | 15 |
| Groove depth of main groove |  |  | 14 | 14 | 14 | 14 |
| Position of main groove |  |  | 50 (50) | 50 (50) | 50 (50) | 50 (50) |
| Groove depth of shoulder lug groove |  |  | 15 | 15 | 15 | 15 |
| Number of shoulder blocks |  |  | — | 2 | 2 | 2 |
| Presence of projection |  |  | Yes | Yes | Yes | Yes |
| Groove element of center block |  |  | Narrow groove/sipe | Narrow groove/sipe | Narrow groove/sipe | Narrow groove/sipe |
| Groove element of shoulder block |  |  | Sipe/narrow groove | Sipe/narrow groove | Sipe/narrow groove | Sipe/narrow groove |
| Crossing groove group |  |  | Yes | Yes | Yes | Yes |
| Noise performance |  | Index value | 100 | 103 | 115 | 105 |
| Startability |  | Index value | 100 | 103 | 115 | 105 |

|  |  |  | Comparative Example 4 | Example 2 | Example 3 | Example 4 |
|---|---|---|---|---|---|---|
| Number of linear groove portions |  |  | 5 | 6 | 5 | 5 |
| Types of inclination angles of linear groove portion |  |  | 3 | 4 | 3 | 4 |
| Inclination angle | First linear groove portion | ° | 9 | 9 | 9 | 9 |
|  | Second linear groove portion | ° | 163 | 163 | 163 | 163 |
|  | Third linear groove portion | ° | 62 | 62 | 62 | 62 |
|  | Fourth linear groove portion | ° | 163 | 163 | 163 | 153 |
|  | Fifth linear groove portion | ° | 62 | 62 | 62 | 62 |
|  | Sixth linear groove portion | ° | — | 20 | — | — |
| Types of lengths of linear groove portion |  |  | 4 | 6 | 5 | 5 |
| Length | First linear groove portion | % | 25 | 25 | 25 | 25 |
|  | Second linear groove portion | % | 10 | 15 | 15 | 15 |
|  | Third linear groove portion | % | 20 | 4 | 7 | 4 |
|  | Fourth linear groove portion | % | 25 | 32 | 37 | 37 |
|  | Fifth linear groove portion | % | 40 | 19 | 19 | 19 |
|  | Sixth linear groove portion | % | — | 5 | — | — |
| Groove width of main groove |  |  | 15 | 15 | 15 | 15 |
| Groove depth of main groove |  |  | 14 | 14 | 14 | 14 |
| Position of main groove |  |  | 50 (50) | 50 (50) | 50 (50) | 50 (50) |
| Groove depth of shoulder lug groove |  |  | 15 | 15 | 15 | 15 |

TABLE 1-continued

|  |  | | | | |
|---|---|---|---|---|---|
| Number of shoulder blocks | | 2 | 2 | 2 | 2 |
| Presence of projection | | Yes | Yes | Yes | Yes |
| Groove element of center block | | Narrow groove/sipe | Narrow groove/sipe | Narrow groove/sipe | Narrow groove/sipe |
| Groove element of shoulder block | | Sipe/narrow groove | Sipe/narrow groove | Sipe/narrow groove | Sipe/narrow groove |
| Crossing groove group | | Yes | Yes | Yes | Yes |
| Noise performance | Index value | 106 | 108 | 108 | 114 |
| Startability | Index value | 106 | 107 | 107 | 114 |

TABLE 2

|  |  |  | Example 5 | Example 6 | Example 7 | Example 8 |
|---|---|---|---|---|---|---|
| Number of linear groove portions | | | 5 | 5 | 5 | 5 |
| Types of inclination angles of linear groove portion | | | 3 | 3 | 3 | 3 |
| Inclination angle | First linear groove portion | ° | 9 | 9 | 9 | 9 |
| | Second linear groove portion | ° | 163 | 163 | 163 | 163 |
| | Third linear groove portion | ° | 62 | 62 | 62 | 62 |
| | Fourth linear groove portion | ° | 163 | 163 | 163 | 163 |
| | Fifth linear groove portion | ° | 62 | 62 | 62 | 62 |
| | Sixth linear groove portion | ° | — | — | — | — |
| Types of lengths of linear groove portion | | | 5 | 5 | 5 | 5 |
| Length | First linear groove portion | % | 25 | 25 | 25 | 25 |
| | Second linear groove portion | % | 15 | 15 | 15 | 15 |
| | Third linear groove portion | % | 4 | 4 | 4 | 4 |
| | Fourth linear groove portion | % | 37 | 37 | 37 | 37 |
| | Fifth linear groove portion | % | 19 | 19 | 19 | 19 |
| | Sixth linear groove portion | % | — | — | — | — |
| Groove width of main groove | | | 15 | 15 | 15 | 15 |
| Groove depth of main groove | | | 14 | 14 | 14 | 14 |
| Position of main groove | | | 50 (50) | 50 (50) | 50 (50) | 50 (50) |
| Groove depth of shoulder lug groove | | | 10 | 20 | 15 | 15 |
| Number of shoulder blocks | | | 2 | 2 | 1 | 2 |
| Presence of projection | | | Yes | Yes | Yes | No |
| Groove element of center block | | | Narrow groove/sipe | Narrow groove/sipe | Narrow groove/sipe | Narrow groove/sipe |
| Groove element of shoulder block | | | Sipe/narrow groove | Sipe/narrow groove | Sipe/narrow groove | Sipe/narrow groove |
| Crossing groove group | | | Yes | Yes | Yes | Yes |
| Noise performance | | Index value | 113 | 112 | 113 | 113 |
| Startability | | Index value | 112 | 113 | 111 | 113 |

|  |  |  | Example 9 | Example 10 | Example 11 | Example 12 |
|---|---|---|---|---|---|---|
| Number of linear groove portions | | | 5 | 5 | 5 | 5 |
| Types of inclination angles of linear groove portion | | | 3 | 3 | 3 | 3 |
| Inclination angle | First linear groove portion | ° | 9 | 9 | 9 | 9 |
| | Second linear groove portion | ° | 163 | 163 | 163 | 163 |
| | Third linear groove portion | ° | 62 | 62 | 62 | 62 |
| | Fourth linear groove portion | ° | 163 | 163 | 163 | 163 |
| | Fifth linear groove portion | ° | 62 | 62 | 62 | 62 |
| | Sixth linear groove portion | ° | — | — | — | — |

TABLE 2-continued

| | | | | | | |
|---|---|---|---|---|---|---|
| Types of lengths of linear groove portion | | | 5 | 5 | 5 | 5 |
| Length | First linear groove portion | % | 25 | 25 | 25 | 25 |
| | Second linear groove portion | % | 15 | 15 | 15 | 15 |
| | Third linear groove portion | % | 4 | 4 | 4 | 4 |
| | Fourth linear groove portion | % | 37 | 37 | 37 | 37 |
| | Fifth linear groove portion | % | 19 | 19 | 19 | 19 |
| | Sixth linear groove portion | % | — | — | — | — |
| Groove width of main groove | | | 15 | 15 | 15 | 15 |
| Groove depth of main groove | | | 14 | 14 | 14 | 14 |
| Position of main groove | | | 25 (75) | 30 (70) | 80 (20) | 85 (15) |
| Groove depth of shoulder lug groove | | | 15 | 15 | 15 | 15 |
| Number of shoulder blocks | | | 2 | 2 | 2 | 2 |
| Presence of projection | | | Yes | Yes | Yes | Yes |
| Groove element of center block | | | Narrow groove/sipe | Narrow groove/sipe | Narrow groove/sipe | Narrow groove/sipe |
| Groove element of shoulder block | | | Sipe/narrow groove | Sipe/narrow groove | Sipe/narrow groove | Sipe/narrow groove |
| Crossing groove group | | | Yes | Yes | Yes | Yes |
| Noise performance | | Index value | 112 | 114 | 114 | 113 |
| Startability | | Index value | 113 | 114 | 114 | 112 |

TABLE 3

| | | | Example 13 | Example 14 | Example 15 | Example 16 |
|---|---|---|---|---|---|---|
| Number of linear groove portions | | | 5 | 5 | 5 | 5 |
| Types of inclination angles of linear groove portion | | | 3 | 3 | 3 | 3 |
| Inclination angle | First linear groove portion | ° | 9 | 9 | 9 | 9 |
| | Second linear groove portion | ° | 163 | 163 | 163 | 163 |
| | Third linear groove portion | ° | 62 | 62 | 62 | 62 |
| | Fourth linear groove portion | ° | 163 | 163 | 163 | 163 |
| | Fifth linear groove portion | ° | 62 | 62 | 62 | 62 |
| | Sixth linear groove portion | ° | — | — | — | — |
| Types of lengths of linear groove portion | | | 5 | 5 | 5 | 5 |
| Length | First linear groove portion | % | 25 | 25 | 25 | 25 |
| | Second linear groove portion | % | 15 | 15 | 15 | 15 |
| | Third linear groove portion | % | 4 | 4 | 4 | 4 |
| | Fourth linear groove portion | % | 37 | 37 | 37 | 37 |
| | Fifth linear groove portion | % | 19 | 19 | 19 | 19 |
| | Sixth linear groove portion | % | — | — | — | — |
| Groove width of main groove | | | 9 | 20 | 15 | 15 |
| Groove depth of main groove | | | 14 | 14 | 10 | 18 |
| Position of main groove | | | 50 (50) | 50 (50) | 50 (50) | 50 (50) |
| Groove depth of shoulder lug groove | | | 15 | 15 | 10 | 18 |
| Number of shoulder blocks | | | 2 | 2 | 2 | 2 |
| Presence of projection | | | Yes | Yes | Yes | Yes |
| Groove element of center block | | | Narrow groove/sipe | Narrow groove/sipe | Narrow groove/sipe | Narrow groove/sipe |
| Groove element of shoulder block | | | Sipe/narrow groove | Sipe/narrow groove | Sipe/narrow groove | Sipe/narrow groove |
| Crossing groove group | | | Yes | Yes | Yes | Yes |
| Noise performance | | Index value | 114 | 112 | 113 | 112 |
| Startability | | Index value | 111 | 113 | 111 | 113 |

TABLE 3-continued

|  |  |  | Example 17 | Example 18 | Example 19 | Example 20 |
|---|---|---|---|---|---|---|
| Number of linear groove portions |  |  | 5 | 5 | 5 | 5 |
| Types of inclination angles of linear groove portion |  |  | 3 | 3 | 3 | 3 |
| Inclination angle | First linear groove portion | ° | 9 | 9 | 9 | 9 |
|  | Second linear groove portion | ° | 163 | 163 | 163 | 163 |
|  | Third linear groove portion | ° | 62 | 62 | 62 | 62 |
|  | Fourth linear groove portion | ° | 163 | 163 | 163 | 163 |
|  | Fifth linear groove portion | ° | 62 | 62 | 62 | 62 |
|  | Sixth linear groove portion | ° | — | — | — | — |
| Types of lengths of linear groove portion |  |  | 5 | 5 | 5 | 5 |
| Length | First linear groove portion | % | 25 | 25 | 25 | 25 |
|  | Second linear groove portion | % | 15 | 15 | 15 | 15 |
|  | Third linear groove portion | % | 4 | 4 | 4 | 4 |
|  | Fourth linear groove portion | % | 37 | 37 | 37 | 37 |
|  | Fifth linear groove portion | % | 19 | 19 | 19 | 19 |
|  | Sixth linear groove portion | % | — | — | — | — |
| Groove width of main groove |  |  | 15 | 15 | 15 | 15 |
| Groove depth of main groove |  |  | 14 | 14 | 14 | 14 |
| Position of main groove |  |  | 50 (50) | 50 (50) | 50 (50) | 50 (50) |
| Groove depth of shoulder lug groove |  |  | 15 | 15 | 15 | 15 |
| Number of shoulder blocks |  |  | 2 | 2 | 2 | 2 |
| Presence of projection |  |  | Yes | Yes | Yes | Yes |
| Groove element of center block |  |  | Narrow groove | Sipe | Sipe/narrow groove | Narrow groove/sipe |
| Groove element of shoulder block |  |  | Sipe | Narrow groove | Narrow groove/sipe | Sipe/narrow groove |
| Crossing groove group |  |  | Yes | Yes | Yes | No |
| Noise performance |  | Index value | 115 | 114 | 115 | 113 |
| Startability |  | Index value | 114 | 115 | 115 | 113 |

As can be seen from Tables 1 and 3, any of Examples 1 to 20 has effectively improved noise performance and starting performance as compared to Comparative Example 1. In addition, only the startability on gravel road surfaces was evaluated. However, even in the case of driving on other unpaved roads (mud roads, rocky areas, snowy roads, and the like), the tire according to an embodiment of the present technology effectively works for mud, rocks, snow, and the like on road surfaces and thus can exert excellent starting performance on any types of unpaved roads.

On the other hand, in Comparative Example 2, since the number of linear groove portions is two and the bent shape of the main groove is monotonic, the effect of improving the starting performance is not sufficiently obtained. In Comparative Example 3, since the number of types of inclination angles of the linear groove portion is two types, the bent shape of the main groove is not sufficiently complex, and the effect of improving the starting performance is not sufficiently obtained. In Comparative Example 4, since the number of types of lengths of the linear groove portion is four types, the bent shape of the main groove is not sufficiently complex, and the effect of improving the starting performance is not sufficiently obtained.

The invention claimed is:

1. A pneumatic tire, comprising:
a tread portion that extends in a tire circumferential direction and forms an annular shape;
a pair of sidewall portions disposed on both sides of the tread portion;
a pair of bead portions disposed on an inner side of the pair of sidewall portions in a tire radial direction; and
a pair of main grooves extending along the tire circumferential direction on both sides of a tire equator of the tread portion, each of three rows of land portions defined by the pair of main grooves being further defined into a plurality of blocks,
the pair of main grooves being configured so that a series of bent elements formed by connecting at least five linear groove portions via bend points are continuously and repeatedly arranged in the tire circumferential direction, and
the at least five linear groove portions included in each of the series of bent elements having three or more types of inclination angles with respect to the tire circumferential direction and having five or more types of lengths, wherein
the tread portion includes only two main grooves, the two main grooves forming the pair of main grooves.

2. The pneumatic tire according to claim 1, wherein three linear groove portions adjacent to each other in the tire circumferential direction in each of the series of bent elements are
a displacement groove portion having a length shorter than a groove width of the pair of main grooves and a pair of parallel groove portions arranged on both sides in the tire circumferential direction and having a same inclination angle.

3. The pneumatic tire according to claim 1, wherein a shoulder block defined on an outer side in a tire width direction of the pair of main grooves among the plurality of blocks is defined by a shoulder lug groove extending from the pair of main grooves beyond a ground contact edge, and two of the shoulder blocks are disposed on the outer side in the tire width direction of one of the series of bent elements.

4. The pneumatic tire according to claim 3, wherein the pair of main grooves and the shoulder lug groove have a same groove depth.

5. The pneumatic tire according to claim 1, comprising projections on a groove bottom of the pair of main grooves, the projections rising from the groove bottom of the pair of main grooves and extending along the pair of main grooves.

6. The pneumatic tire according to claim 1, wherein, when a length in a tire width direction from the tire equator to a ground contact edge is defined as a distance W, the pair of main grooves is disposed on an outer side in the tire width direction at a position separated from the tire equator by 30% or more of the distance W.

7. The pneumatic tire according to claim 1, wherein, when a length in a tire width direction from the tire equator to a ground contact edge is defined as a distance W, the pair of main grooves is disposed on an inner side in the tire width direction at a position separated from the ground contact edge by 20% or more of the distance W.

8. The pneumatic tire according to claim 1, wherein a maximum width of the pair of main grooves is from 9 mm to 20 mm.

9. The pneumatic tire according to claim 1, wherein a groove depth of the pair of main grooves is from 10 mm to 18 mm.

10. The pneumatic tire according to claim 1, wherein, when a block defined on an outer side in a tire width direction of the pair of main grooves among the plurality of blocks is defined as a shoulder block, and a block defined between the pair of main grooves is defined as a center block, a sipe that is open to the pair of main grooves is formed in a road contact surface of the shoulder block, and a narrow groove that is open to the pair of main grooves is formed in a road contact surface of the center block.

11. The pneumatic tire according to claim 1, wherein
a shoulder block defined on an outer side in a tire width direction of the pair of main grooves among the plurality of blocks is defined by a shoulder lug groove extending from the pair of main grooves beyond a ground contact edge,
a center block defined between the pair of main grooves among the plurality of blocks is defined by center lug grooves that connect the pair of main grooves and extend in the tire width direction and auxiliary grooves that connect the center lug grooves adjacent to each other in the tire circumferential direction,
first groove elements formed from narrow grooves and/or sipes are provided on a surface of the shoulder block and a second groove elements formed from narrow grooves and/or sipes are provided on a surface of the center block, the first groove elements extending from a side surface on a ground contact edge side of the shoulder block to a road contact surface and communicating with the pair of main grooves, and the second groove elements extending across the center block and communicating with the pair of main grooves or the auxiliary grooves, and the first groove elements and the second groove elements form a series of crossing groove groups extending continuously along blocks from the shoulder block on one side in the tire width direction to the shoulder block on an other side in the tire width direction across the pair of main grooves or the auxiliary grooves.

12. The pneumatic tire according to claim 1, wherein
when a bent element of the series of bent elements includes five linear groove portions, and the five linear groove portions are first to fifth linear groove portions in that order from one side in the tire circumferential direction toward an other side in the tire circumferential direction,
an inclination angle of the first linear groove portion with respect to the tire circumferential direction is from 5° to 20°, and a percentage of a length of the first linear groove portion with respect to a total length of the five linear groove portions constituting the bent element is from 15% to 35%,
an inclination angle of the second linear groove portion with respect to the tire circumferential direction is from 150° to 170°, and a percentage of a length of the second linear groove portion with respect to the total length of the five linear groove portions constituting the bent element is from 5% to 25%,
an inclination angle of the third linear groove portion with respect to the tire circumferential direction is from 50° to 70°, and a percentage of a length of a third linear groove portion with respect to the total length of the five linear groove portions constituting the bent element is from 3% to 15%,
an inclination angle of the fourth linear groove portion with respect to the tire circumferential direction is from 150° to 170°, and a percentage of a length of the fourth linear groove portion with respect to the total length of the five linear groove portions constituting the bent element is from 30% to 45%, and
an inclination angle of the fifth linear groove portion with respect to the tire circumferential direction is from 50° to 70°, and a percentage of a length of the fifth linear groove portion with respect to the total length of the five linear groove portions constituting the bent element is from 15% to 35%.

13. The pneumatic tire according to claim 2, wherein
a shoulder block defined on an outer side in a tire width direction of the pair of main grooves among the plurality of blocks is defined by a shoulder lug groove extending from the pair of main grooves beyond a ground contact edge, and two of the shoulder blocks are disposed on the outer side in the tire width direction of one of the series of bent elements; and
the pair of main grooves and the shoulder lug groove have a same groove depth.

14. The pneumatic tire according to claim 13, comprising projections on a groove bottom of the pair of main grooves, the projections rising from the groove bottom of the pair of main grooves and extending along the pair of main grooves;
wherein, when a length in the tire width direction from the tire equator to the ground contact edge is defined as a distance W, the pair of main grooves is disposed on the outer side in the tire width direction at a position separated from the tire equator by 30% or more of the distance W.

15. The pneumatic tire according to claim 14, wherein, when a length in the tire width direction from the tire equator to the ground contact edge is defined as a distance W, the pair of main grooves is disposed on an inner side in the tire width direction at a position separated from the ground contact edge by 20% or more of the distance W.

16. The pneumatic tire according to claim 15, wherein
a maximum width of the pair of main grooves is from 9 mm to 20 mm; and
a groove depth of the pair of main grooves is from 10 mm to 18 mm.

17. The pneumatic tire according to claim 16, wherein, when a block defined on the outer side in the tire width direction of the pair of main grooves among the plurality of blocks is defined as a shoulder block, and a block defined between the pair of main grooves is defined as a center block, a sipe that is open to the pair of main grooves is formed in a road contact surface of the shoulder block, and a narrow groove that is open to the pair of main grooves is formed in a road contact surface of the center block.

18. The pneumatic tire according to claim 17, wherein
the shoulder block defined on the outer side in the tire width direction of the pair of main grooves among the plurality of blocks is defined by the shoulder lug groove extending from the pair of main grooves beyond the ground contact edge,
the center block defined between the pair of main grooves among the plurality of blocks is defined by center lug grooves that connect the pair of main grooves and extend in the tire width direction and auxiliary grooves that connect the center lug grooves adjacent to each other in the tire circumferential direction,
a first groove element formed from narrow grooves and/or sipes is provided on a surface of the shoulder block and a second groove element formed from narrow grooves and/or sipes is provided on a surface of the center block, the first groove element extending from a side surface on a ground contact edge side of the shoulder block to the road contact surface and communicating with the pair of main grooves, and the second groove element extending across the center block and communicating with the pair of main grooves or the auxiliary grooves, and
the first groove element and the second groove element form a series of crossing groove groups extending continuously along blocks from the shoulder block on one side in the tire width direction to the shoulder block on an other side in the tire width direction across the pair of main grooves or the auxiliary grooves.

19. The pneumatic tire according to claim 18, wherein
when a bent element of the series of bent elements includes five linear groove portions, and the five linear groove portions are first to fifth linear groove portions in that order from one side in the tire circumferential direction toward an other side in the tire circumferential direction,
an inclination angle of the first linear groove portion with respect to the tire circumferential direction is from 5° to 20°, and a percentage of a length of the first linear groove portion with respect to a total length of the five linear groove portions constituting the bent element is from 15% to 35%,
an inclination angle of the second linear groove portion with respect to the tire circumferential direction is from 150° to 170°, and a percentage of a length of the second linear groove portion with respect to the total length of the five linear groove portions constituting the bent element is from 5% to 25%,
an inclination angle of the third linear groove portion with respect to the tire circumferential direction is from 50° to 70°, and a percentage of a length of a third linear groove portion with respect to the total length of the five linear groove portions constituting the bent element is from 3% to 15%,
an inclination angle of the fourth linear groove portion with respect to the tire circumferential direction is from 150° to 170°, and a percentage of a length of the fourth linear groove portion with respect to the total length of the five linear groove portions constituting the bent element is from 30% to 45%, and
an inclination angle of the fifth linear groove portion with respect to the tire circumferential direction is from 50° to 70°, and a percentage of a length of the fifth linear groove portion with respect to the total length of the five linear groove portions constituting the bent element is from 15% to 35%.

* * * * *